Aug. 14, 1928.
H. BUEL
1,680,934
COMPOSITION FOR PRESERVING FOOD PRODUCTS
Filed Sept. 8, 1921
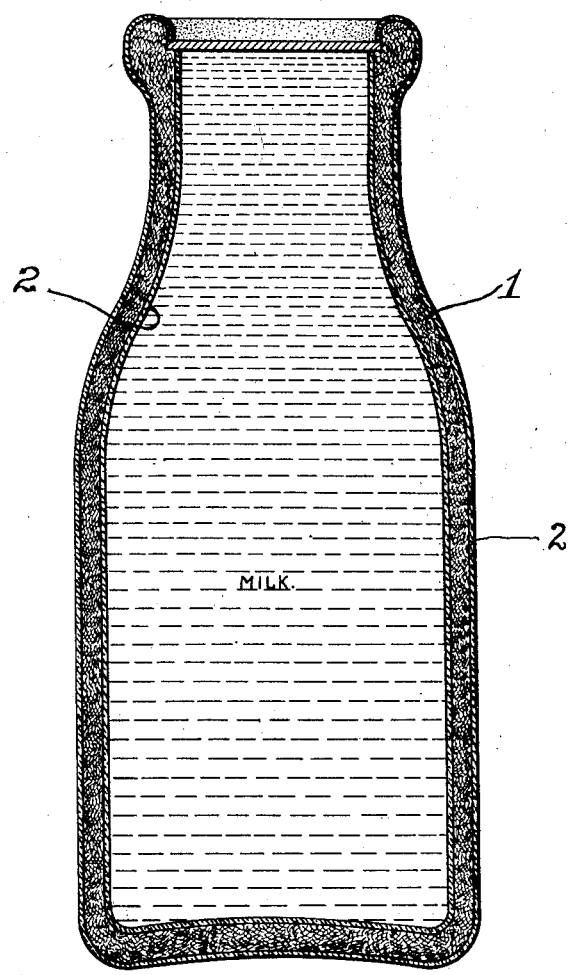
Inventor
HILLHOUSE BUEL
By his Attorneys
Sheffield & Betts Patented Aug. 14, 1928.

1,680,934

UNITED STATES PATENT OFFICE.

HILLHOUSE BUEL, OF SEATTLE, WASHINGTON, ASSIGNOR OF ONE-HALF TO WILLIAM P. HAMMOND, OF SCARSDALE, NEW YORK.

COMPOSITION FOR PRESERVING FOOD PRODUCTS.

Application filed September 8, 1921. Serial No. 499,240.

The principal object of my invention is to provide a commercially practical and novel method of preventing contamination of food products, and particularly those which readily absorb taste and odor from adjacent or juxtaposed materials.

Other objects of my invention will hereinafter more fully appear.

My invention is based on the discovery by me that substantially pure acetyl-cellulose and other acetylated cellulosic products hereinafter mentioned may be used to protect food products from contamination, and, if such products are initially sterile, will at the same time preserve in good condition for a long period of time even such delicate products as fruit, butter and eggs.

According to my method, food products are protected from contamination by a waterproof layer or film of cellulosic material. This protective layer or film may be applied either directly to the food product to be protected, as to the outside of an eggshell or to the surface of a block of butter; to the surface of a wrapper, as the paper wrapping of a package of butter; or to the interior or exterior of a container for food products, such as a milk bottle of pulp or like material.

In the accompanying drawing, in which I have illustrated my invention as applied to a milk bottle,—

The figure is a vertical central section of a pulp milk bottle, containing milk protected from contamination by a protective layer of tasteless, odorless cellulosic material inert to the milk and substances contained therein.

In the drawing 1 is the wall of a milk bottle formed of pulp or like cheap substance, formed preferably according to my prior pending application, Serial No. 195,726, filed October 10, 1917, for process for forming articles from comminuted material. The interior and exterior of wall 1 are covered by layers 2 of tasteless, odorless cellulosic material inert to the liquids and solids of the milk.

Pulp and like substances are partially absorbent of milk and also contain substances which spoil the taste and odor of milk kept in contact therewith, so that untreated pulp has never been used in contact with milk or other delicate food products. I believe, moreover, that I am the first to discover a satisfactory way of treating pulp or like containers to prevent contamination of food products therein.

The layers 2 may be formed on the surfaces of the wall 1 of a bottle or other container by immersing the container in a solution of acetylated cellulose in a volatile solvent or solvents not acting to impart taste or odor to a food product in contact with a film deposited therefrom and then draining the solution from the container and evaporating the solvent to deposit layers of cellulosic material on the walls. I may also spray or brush the solution against the surfaces of wall 1 and then evaporate the solvent material leaving the film on the wall.

I may prepare solutions for use in protecting food products according to my invention by any one of several ways, some of which are original with me and yield novel products.

According to my invention acetyl cellulose or one of the members of the ethyl acetyl cellulose group such as di-ethyl, tri-ethyl, or tetra-ethyl acetyl-cellulose is dissolved in pure high-proof acetone ($CH_3$—CO—$CH_3$) or its equivalent, a mixture of chloroform and alcohol, grain distilled acetone, or a mixture of grain distilled acetone, and a small percentage of pure alcohol, and the container, or food product coated with the solution so formed, as above indicated. The acetone used should be of high-proof and purity. This solvent is obtainable on the market in commercial quantities and of the required purity. The solvent is recovered as far as possible and the percentage recovered can be made very high by the use of vacuum, thus keeping down the cost of the process. Acetyl-cellulose for use in my process should be prepared from cellulose stock of high purity and may be prepared in any of the known methods with reagents of high purity. The solvent used by me being volatile, no heat need be applied in order to deposit the cellulosic material in the form of a coating on whatever object the solution has been applied. Preferably, however, both heat and vacuum are used in withdrawing the solvent. To make a solution suitable for application with a spray or spray-brush, the substances may be mixed in the proportion of three (3) ounces of ethyl acetyl cellulose to one (1) gallon of pure acetone. These are stirred and agitated preferably under conditions which will minimize evaporation of the acetone until the solution is homogeneous. For dipping and heavier spray applications the proportion of acetylated cellulose to the acetone may be increased. In this connection, I find that the solution of ethyl-acetyl-cellulose in acetone may be made of any proportion from the thin liquid solution whose proportions have been given, suitable for dipping or for application by a sprayer, to a thick viscous paste. To make the solution of cellulosic material less inflammable while in solution, the solvent may be prepared with not over 5% of highest proof pure carbon tetrachloride, the remainder of the solvent being acetone as before. The color of a layer of cellulosic material prepared as above may be determined by adding tasteless and odorless pigments to the solution before the solvent is evaporated.

The film or coating prepared as above described is tasteless, odorless, resistant to air, water and to the fats of food products, does not give taste or odor to delicate foods in contact therewith, and protects them from contamination. However, I may increase the mechanical strength and hardness of a layer or film of ethyl acetyl cellulose deposited from a solution of acetone by adding a few drops of standard formalin solution or of formic acid to each gallon of the acetone. The formaldehyde and formic acid act on the ethyl acetyl cellulose to increase its strength and hardness, but do not cause it to give taste or odor to food products in contact therewith. I believe I am the first to observe this action of formaldehyde and formic acid on ethyl acetyl cellulose and the novel product resulting therefrom.

I have found also that small percentages of certain gums and oils may be used in the films or layers of ethyl acetyl cellulose obtained from solutions of acetone and that such additions of oil or gum may favorably affect the mechanical and chemical characteristics of the films or coatings so obtained, I find that white poppy seed oil and other light oils without objectionable taste or odor, such as refined walnut oil, highly refined cocoanut oil, highly refined corn oil, specially refined sweet milk oil, and oils consisting largely of palmitic esters and light gums such as dammer, sanderac, copal, mastic, or a synthetic gum whose trade name is "Cumar" and an ester gum made by the Paramet Chemical Company of New York city are best for this purpose. Oils having characteristics just mentioned are termed by me "plasticising agents" and they prevent the film of acetylated cellulose from cracking and peeling, while the class of gums mentioned increases the mechanical strength of films or sheets of acetylated cellulose containing the same. I may also incorporate in the cellulosic film according to my invention, material such as zinc oxide, aluminum oxide, kieselguhr, talc and the like for the purpose of increasing the resistance of the film to water and oil.

I have discovered that ethyl acetyl cellulose deposited from a solution of acetone may be fused, beginning its fusion at a temperature of approximately 303° F., and that such fusion improves the mechanical characteristics of the cellulosic material and also increases its resistance to reagents as well as to water, to oils and greases, without causing it to give taste or odor to foods. This fusion has a tendency to produce transparency. Thus the films 2, 2 on the bottle illustrated in the figure may be fused after being formed in place, proper precautions being taken to prevent carbonization and oxidation, the commercial value of the bottle being thereby enhanced.

It will be understood, also, that I do not limit myself exclusively to the use of acetylated cellulose provided the added substance or substances do not cause the protective coating to give taste or odor to, or otherwise injuriously affect, the food product in contact therewith. For example, the protective layer may include ten per cent of tri-phenyl phosphate, with no free phenol as a dry solvent or to render the layer at least partially fire-proof and additionally moisture repellant.

While a food product such as milk, eggs or fruit is well protected from air, water, oil and most chemical reagents by a layer of tasteless and odorless cellulosic material according to my invention, such food product is not thereby preserved from decay unless it is initially sterile. When it is desired not only to protect but to preserve food products according to my invention, I submit such products to a vacuum in a chamber connected to exhaust-apparatus in such a way as to remove all air and sensible moisture from the surface and pores of the product, and to kill any bacteria present in liquids or somewhat near the surface of solids. The food product, such as fruit, is then submerged in a coating solution, such as has been described above, or it may be pre-dipped in ethyl alcohol before submerging in the coating solution. While still held under vacuum, the excess solution is drained off or otherwise removed from the fruit, and the portion of the solution adhering to the fruit dried in the vacuum thereby forming an encasing layer or film of tasteless, odorless cellulosic material on the fruit. By this method fruit and eggs, or the like, may be preserved for a relatively long period of time, the protective layer of cellulosic material preventing air and germs from reaching the products.

It will be seen that I have devised a method adapted to protect milk, eggs, butter, fruits, vegetables, meat, nuts and other food products and to preserve them from decay.

While I prefer to make the body of container 1 of pulp, I do not limit myself to this. Neither do I limit myself to using cellulosic material on both outer and inner surfaces of such container, as the object of my present invention is accomplished by using such material on the inner surface only, i. e., the surface in contact with the food product.

While I have described in detail the preferred manner of practicing my invention, I do not wish to be limited to details of my above disclosure except in so far as such details are essential to the validity of the appended claims.

In particular, I may use other solvents than acetone provided they may be obtained in commercial quantities and possess the necessary characteristics of readily dissolving acetylated cellulosic material, volatility, and of imparting no taste or odor to food products stored in contact with cellulosic films deposited therefrom.

Having thus described my invention, I claim:

1. A composition of matter comprising a cellulosic material of relatively high strength and resistance, deposited from a solution of ethyl acetyl cellulose containing a small percentage of formaldehyde by evaporation of the solvent from the solution, the deposited composition being non-hygroscopic and imparting no objectionable taste or odor to food when kept in prolonged contact therewith.

2. A solution for use in preserving food products comprising acetylated cellulose, high-proof grain distilled acetone, and a light oil plasticising agent, giving on evaporation a residue having no objectionable taste or odor.

3. A solution for use in preserving food products comprising acetylated cellulose, high-proof grain distilled acetone, and a plasticising agent, giving on evaporation a residue having no objectionable taste or odor.

4. A solution for use in preserving food products comprising acetylated cellulose, high-proof grain distilled acetone, and a strengthening agent, giving on evaporation a residue having no objectionable taste or odor.

5. A solution for use in preserving food products comprising acetylated cellulose, high-proof acetone, and a plasticising agent, giving on evaporation no residue having objectionable taste or odor.

6. A composition of matter comprising a cellulosic material of relatively high strength and resistance, deposited from a solution of ethyl acetyl cellulose in acetone, containing a plasticising agent of light oil, said oil imparting no objectionable taste or odor to food in contact therewith, the deposited material being subsequently fused.

HILLHOUSE BUEL.